Sept. 9, 1924.

M. O. CRAWFORD

MECHANICAL MOTION

Filed Feb. 14, 1922

Inventor:
Matthew O. Crawford
Orwig and Hague,
Attorneys.

Sept. 9, 1924.　　　　　　　　　　　　　　1,507,908
M. O. CRAWFORD
MECHANICAL MOTION
Filed Feb. 14, 1922　　　3 Sheets-Sheet 2

Inventor
Matthew O. Crawford
Orwig and Hague
Attorneys.

Sept. 9, 1924.

M. O. CRAWFORD

MECHANICAL MOTION

Filed Feb. 14, 1922

Inventor
Matthew O. Crawford
Orwig and Hague
Attorneys.

Patented Sept. 9, 1924.

1,507,908

UNITED STATES PATENT OFFICE.

MATTHEW O. CRAWFORD, OF BELMOND, IOWA.

MECHANICAL MOTION.

Application filed February 14, 1922. Serial No. 536,579.

*To all whom it may concern:*

Be it known that I, MATTHEW O. CRAWFORD, a citizen of the United States, and a resident of Belmond, in the county of Wright and State of Iowa, have invented a certain new and useful Mechanical Motion, of which the following is a specification.

The object of my invention is to provide a mechanical motion of simple, durable and inexpensive construction, especially designed for use in transmitting power from a pulley or the like to a reciprocating motion, such for instance as is necessary to operate an ordinary pump, and at the same time provide for a considerable speed reduction from the pulley to the reciprocating member, and to accomplish this result with a minimum number of gears of minimum size.

More specifically it is my object to provide a mechanical motion of this class that is especially adapted for use as a pump jack, and in this connection it is my object to provide, as part of my improved mechanical motion, a pump jack of simple, durable and inexpensive construction which may be clamped directly to the pump stock and does not need a separate support, and in which the center of the pulley may be in line with the center of the pump stock to avoid twisting strain as applied to the frame of the pump jack; and further to provide the necessary speed reducing gears, which gears may be of minimum size and so located and arranged as to be capable of being compactly assembled to produce a pump jack of light weight and inexpensive construction occupying a minimum amount of space.

More specifically it is my object to provide a mechanical motion whereby power may be transmitted from the rotary shaft to a reciprocating member, such for instance as a pump rod, by means of a round eccentrically mounted spur gear, and an elliptical spur gear in mesh therewith and having twice the number of teeth, so that by means of these two gears the speed of rotation is reduced one-half, and at the same time the reciprocating motion as applied to the pump rod is made relatively slow during the up and down strokes, and relatively rapid during the time that the crank arm on the elliptical gear is passing dead center, and whereby the maximum amount of power applied to the driving shaft will be available during the pumping stroke, and whereby the time consumed during such parts of the strokes as are not effective in pumping will be minimized.

A further object is to provide a mechanical motion of this character in which the shaft, upon which the driving pulley is rotatably mounted, rotates in the same direction as the pulley, but at a reduced speed, thereby reducing the amount of friction and wear between the pulley and the driving shaft.

My invention consists in the construction, arrangement and combination of the various parts of the device, whereby the objects contemplated are attained, as hereinafter more fully set forth, pointed out in my claim, and illustrated in the accompanying drawings, in which:

Figure 1:
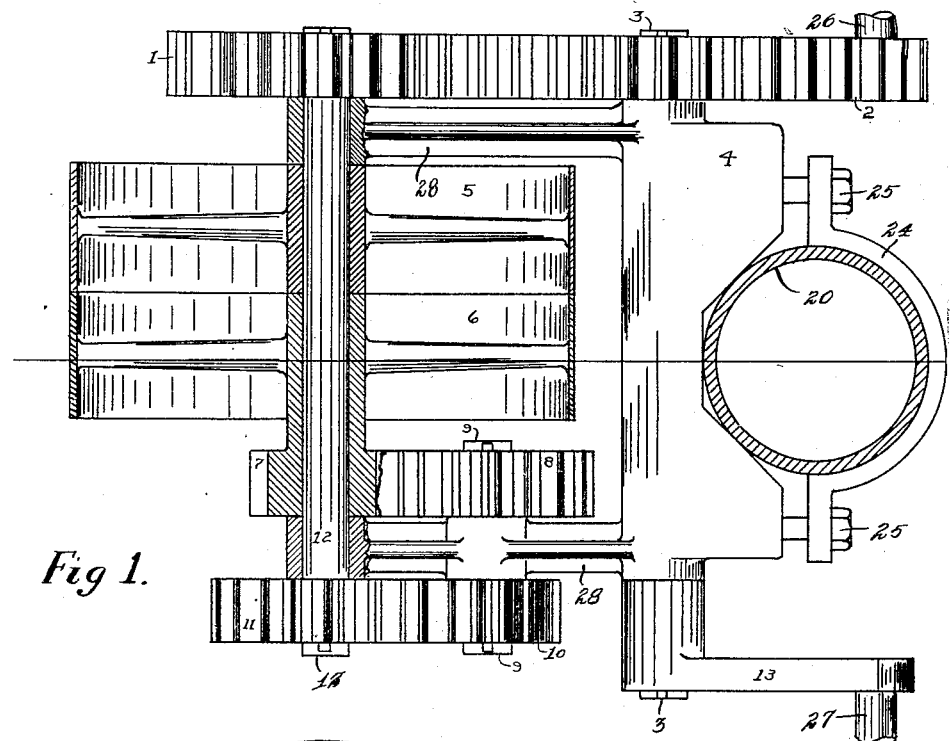
Figure 1 shows a top or plan view of my improved mechanical motion applied to a pump stock, the pump stock and parts of the device being shown in section.
Figure 2:
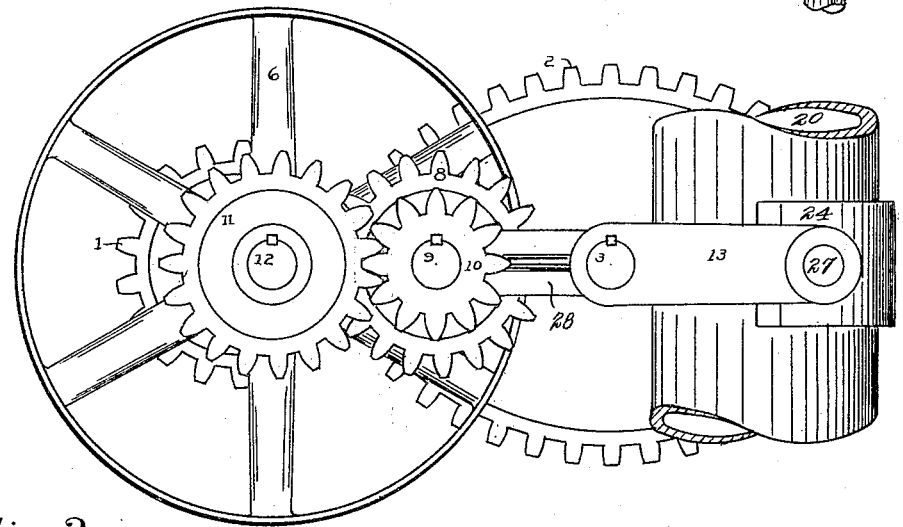
Figure 2 shows a side elevation of the same.

Referring to the accompanying drawings, I have used the reference numeral 20 to indicate a pump stock having a reciprocating piston rod 21 connected with a cross head 22 from which the two crank arms 23 are extended downwardly for driving purposes.

Detachably mounted upon the pump stock is the frame body 4, one side of which is shaped to receive the adjacent side of the pump stock. Opposed to the body portion 4 is a clamp 24 to engage the opposite side of the pump stock and to be firmly clamped to the body portion 4 by bolts 25.

Mounted in the body portion 4 is a rotatable driving shaft 3 to which is fixed at one end a crank 13, and at the other end an elliptical spur toothed gear 2, the latter of which has a crank pin 26 connected to the adjacent arm 23, and the crank 13 has a crank pin 27 connected to the opposite one of the arms 23.

Thus, the said pins 26 and 27 are made to jointly operate the reciprocating pump rod when the shaft 3 is rotated.

Formed on the frame 4 are the frame members 28, in the outer ends of which is rotatively mounted the pulley shaft 12, and on this pulley shaft 12 are rotatably mounted the pulley 5 and the pulley 6, the latter is formed with a sleeve upon which is formed a small spur toothed gear 7.

Mounted in the frame member 28 is a rotatable shaft 9, on one end of which is fixed the spur gear 8 in mesh with the gear 7, and on the other end is fixed the small spur gear 10 in mesh with a larger spur gear 11 which is keyed to the shaft 12.

By this arrangement of parts, it is obvious that the entire device may be clamped to a pump stock readily, easily and quickly, and does not need any separate support.

Furthermore, the draft upon the belt pulley 6 which is the drive pulley, is in a straight line through the pump stock so that there is no side pull or strain upon the frame.

Furthermore, the speed of the pulley 6 will be twice reduced as applied to the shaft 12; and furthermore, the direction of rotation of the shaft 12 will be the same as the direction of rotation of the pulley 6, so that the friction and wear of the pulley 6 upon the shaft 12 will be reduced to minimum.

For the purpose of transmitting power from the shaft 12 to the shaft 3, I have provided two meshing gear wheels, one, indicated generally by the symbol 1, is a circular spur tooth gear wheel, but it is mounted eccentrically upon the shaft 12. The other, indicated by the numeral 2, is substantially elliptical in shape and has twice the number of gear teeth; and as these two gear wheels are constantly in mesh, it is obvious that the elliptical gear wheel is rotated at one-half the average speed of the eccentric gear wheel.

In order to provide for the perfect intermeshing of the gear teeth of the elliptical and eccentric gears during the entire revolution, I have formed the eccentric gear teeth on radial lines from the center thereof with the teeth equally spaced apart as in an ordinary spur gear.

Figure 3:
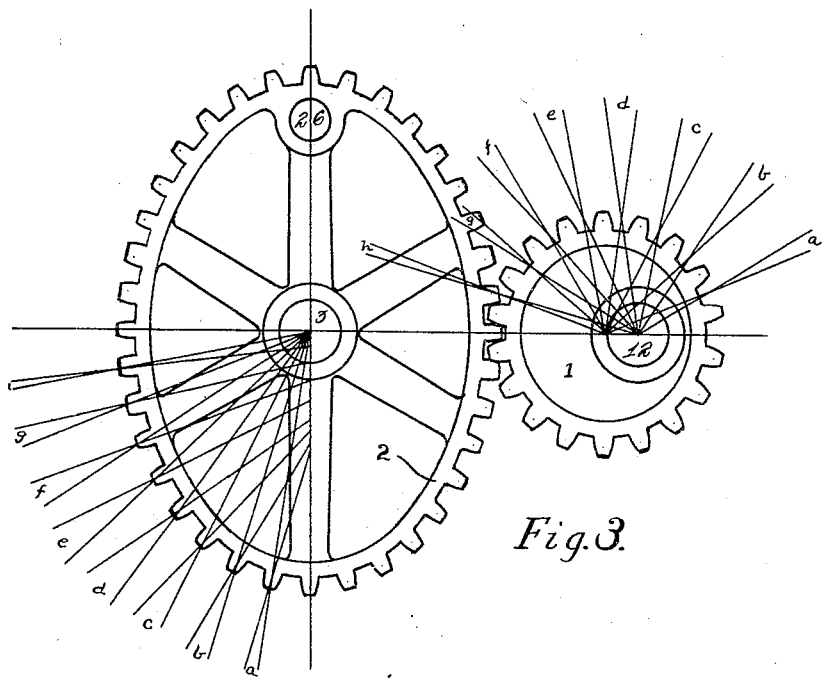
Figure 3 shows a side elevation of the eccentric and elliptical gears in mesh with each other.

For forming the teeth on the elliptical gear, I proceed as follows:

The four teeth, that are arranged as shown in Figure 3, at the top center, bottom center, left side center and right side center are all formed in lines radial to the axis of the elliptical gear.

In forming the first tooth below the left center tooth, I develop the pitch center thereof as follows:

Referring to the projected lines marked $h$ in Figure 3, it will be seen that these projected lines commence one at the actual center of the spur gear 1, and the other line commences at the shaft center. Then a center is formed at the pitch line of the tooth space, which space will, during the rotation of the gears, receive this first tooth through which the projected lines "$h$" are shown in the elliptical gear. I then develop or measure the difference in angularity between the two projected lines "$h$" on the gear 1 as shown in Figure 3. I then draw a line from the center of the elliptical gear through the pitch center of the teeth on the elliptical gear under consideration. I then project another line through the pitch center of the said tooth on the elliptical gear, the angularity of which corresponds to the difference of angularity between the two projected lines "$h$" on the gear 1, and this second one of the projected lines "$h$" on the gear 2 is extended to a point directly below the center of the elliptical gear, and it is the point where this second one of the projected lines "$h$" strikes the vertical line through the center of the gear 2, as shown in Figure 3, that is used as a center upon which the sides of the teeth under consideration are developed.

In developing the next tooth on the elliptical gear, the one through which the projected lines "$g$" are extended, I proceed as follows:

Commencing at the next tooth space on the gear 1, it being the one through which the projected lines "$g$" are drawn, and being the same one that is designed to receive the tooth on the elliptical gear through which the projected lines "$g$" are extended, I project two lines marked "$g$" on the gear 1, one of them being radial to the center of the gear 1, and the other being radial to the shaft of the gear 1, and determine the degree of angularity between these two lines. I then place the projected lines "$g$" upon the gear 2, to the tooth under consideration having the same degree of angularity with relation to each other as the projected lines "$g$" on the gear 1. One of these lines is radial to the center of the gear 2, and the end of the other strikes the vertical line through the gear 2 at a point below the center, and it is this point that is used as a center upon which the sides of the tooth are developed.

Each tooth in turn through a given quarter of the gear 2 is developed in the same manner, and the projected lines respectively are indicated in Figure 3 by the symbols "$f$", "$e$", "$d$", "$c$", "$b$", "$a$".

In the practical operation of this part of the device comprising the eccentric and elliptical gears, it is obvious that the gear 1 will make two revolutions to each revolution of the gear 2.

Figure 4:
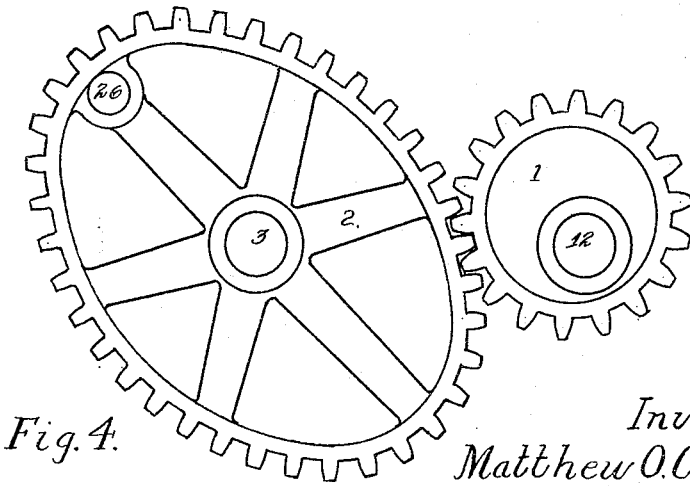
Figure 4 shows a like view with the elliptical gear arranged at an angle of approximately forty-five degrees relative to its position as shown in Figure 3.
Figure 6:
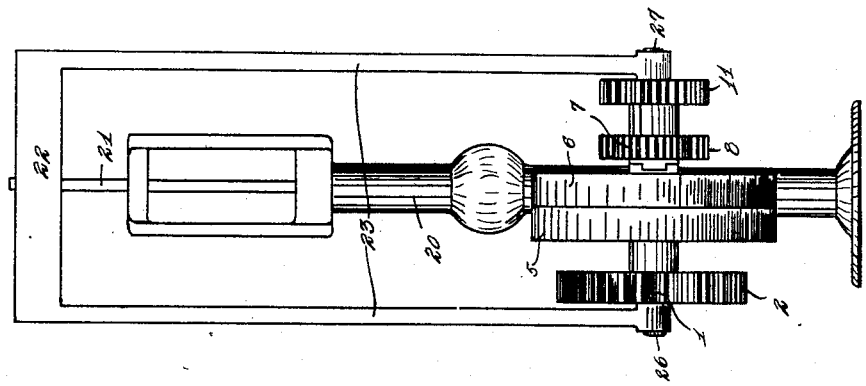
Figure 6 shows a front elevation of the same.
Figure 5:
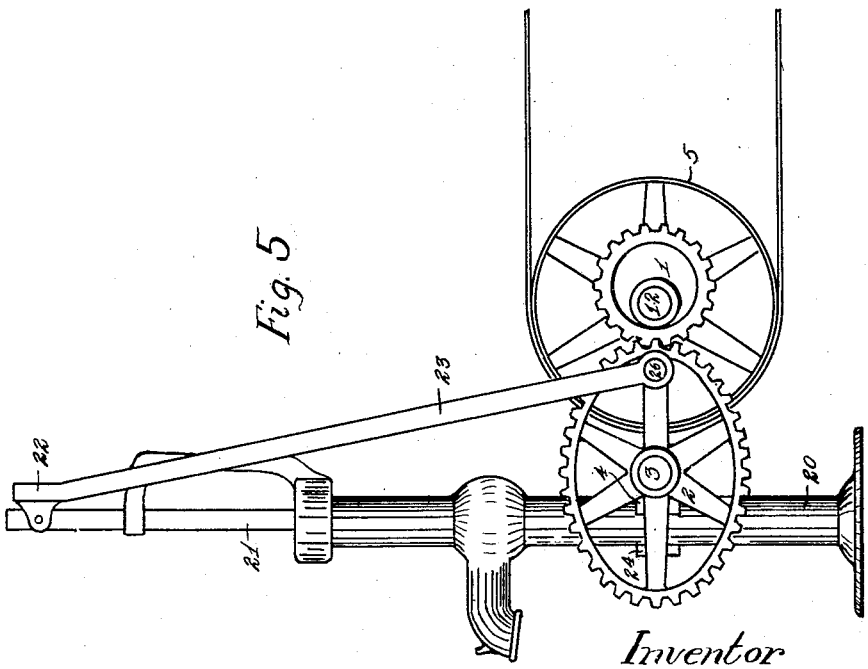
Figure 5 shows a side elevation of my improved mechanical motion applied to a pump and a driving belt.

It is also obvious that due to the development of the angularity of the gear teeth on the gear 2 that has been previously described, the gear teeth on the eccentric and elliptical gears will mesh accurately throughout the entire revolution, and this is made apparent upon examination of Figure 4.

Another material advantage gained by the use of my improved gearing is that during that part of the pump piston stroke in which the movement of the crank pin 26 is relatively horizontal, the speed of travel of the crank pin will be relatively rapid, whereas during that part of the stroke of the movement of the crank pin 26 which is relatively vertical, the speed of travel of the crank pin will be relatively slow.

Hence, during the effective stroke of the pump piston, or other object to which this device is applied, there will be greater power due to the relatively slow movement than there is during the part of the movement which is not what might be termed the effective part of the stroke.

I claim as my invention:

In a device of the class described, comprising a frame, means for securing the frame to a support, such for instance as a pump stock, a crank shaft mounted in the frame, a crank on one end thereof, a pulley shaft mounted in the frame, a pulley rotatably mounted on the pulley shaft, a spur gear fixedly connected to the pulley, a spur gear fixed to the pulley shaft, a train of gears arranged to transmit power from the first mentioned spur gear to the second spur gear the said second spur gear being fixed eccentric to the pulley shaft, and an elliptical gear fixed to one end of the crank shaft and in mesh with the said second gear, for the purpose as stated.

Des Moines, Iowa, February 8, 1922.

MATTHEW O. CRAWFORD.